Feb. 21, 1933.　　　　G. LOWKRANTZ　　　　1,898,675
SPEED CONTROL FOR MOTION PICTURE CAMERAS
Filed Feb. 1, 1929　　　4 Sheets-Sheet 2

INVENTOR.
GUNNE LOWKRANTZ
BY
ATTORNEY.

Feb. 21, 1933.  G. LOWKRANTZ  1,898,675
SPEED CONTROL FOR MOTION PICTURE CAMERAS
Filed Feb. 1, 1929  4 Sheets-Sheet 4

INVENTOR.
GUNNE LOWKRANTZ
BY Philip S. Hopkins
ATTORNEY.

Patented Feb. 21, 1933

1,898,675

UNITED STATES PATENT OFFICE

GUNNE LOWKRANTZ, OF BINGHAMTON, NEW YORK, ASSIGNOR TO AGFA ANSCO CORPORATION, OF BINGHAMTON, NEW YORK, A CORPORATION OF NEW YORK

SPEED CONTROL FOR MOTION PICTURE CAMERAS

Application filed February 1, 1929. Serial No. 336,830.

My invention relates generally to a speed control for motion picture cameras and particularly to a means for changing the speed of the shutter and film moving mechanism from the relatively slow speed at which normal or standard motion pictures are taken to a high speed at which so-called "slow" movies are taken.

Another object of my invention is to provide a speed changing mechanism which may be quickly and easily operated by the user of a motion picture camera and shifted readily from a slow or normal to high speed and vice versa.

Another object of my invention is to provide means whereby the speed change can only be made when the camera mechanism is running.

A further object of my invention is to provide means whereby the camera mechanism must be started at normal speed before the change to high speed can be effected and also means whereby stopping of the camera mechanism can be effected only after the speed has been changed from high speed to normal speed, except in one particular manner hereinafter described.

Other objects and advantages in details of construction and operation will be apparent as the description now proceeds, reference being had to the figures of the accompanying drawings forming a part of this application and wherein like reference numerals indicate like parts.

In the drawings:—

Figure 1:
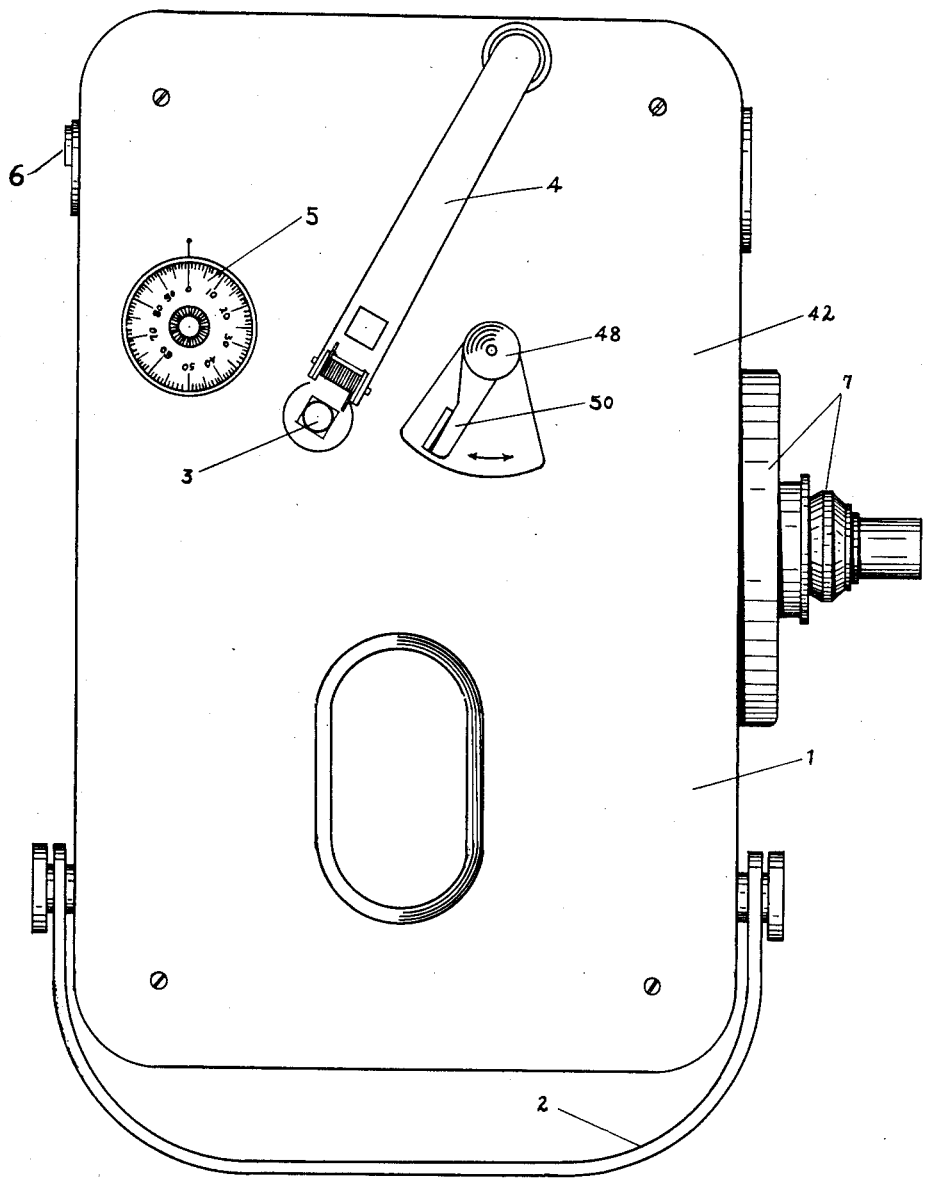
Figure 1 is a side view of a motion picture camera of the type to which my invention is particularly adaptable.

I have shown and will describe one type of motion picture camera to which my invention is adapted but it will be understood that the application of the invention is not limited thereto.

The reference numeral 1 indicates generally a motion picture camera provided with the handle or carrying strap 2, spring winding shaft 3, crank 4, footage counter 5 and sighting device or view finder 6. The usual lens and shutter casing is indicated at 7.

Figure 3:
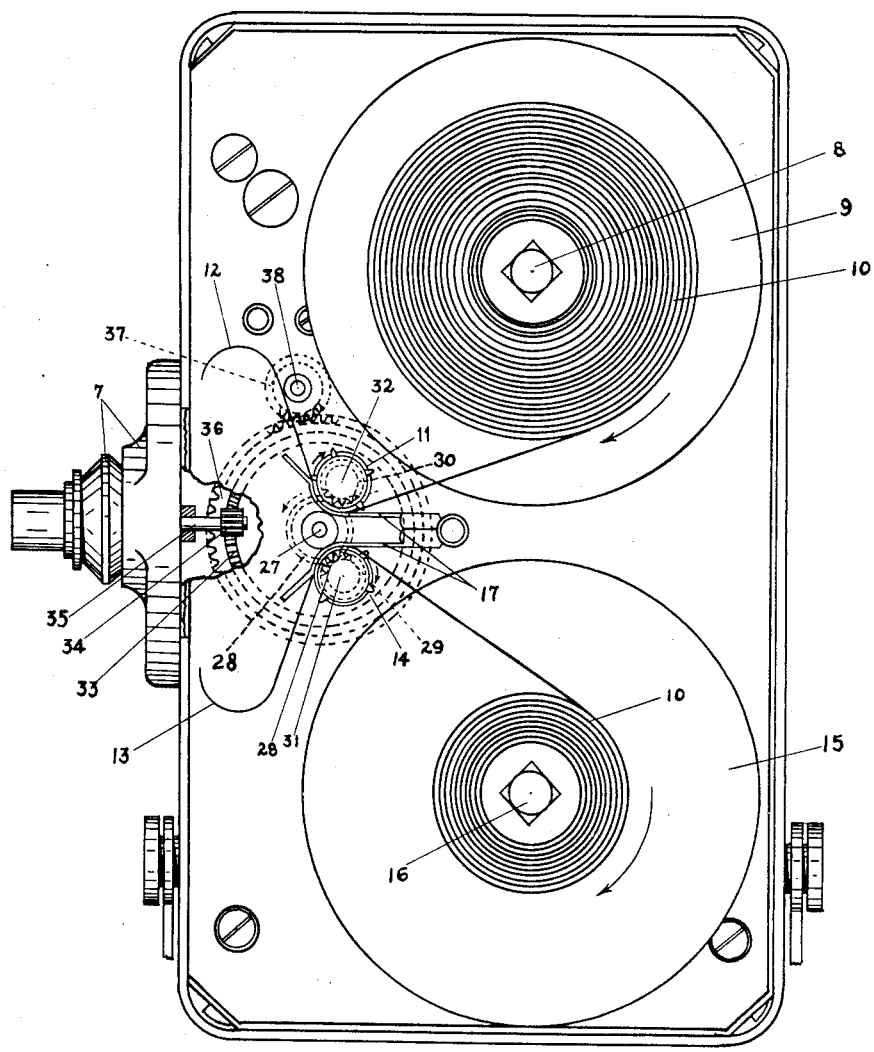
Figure 3 is a side view of the camera with one cover plate removed showing the film feeding arrangement.

The camera is provided with a shaft or spindle 8 upon which may be mounted a supply reel 9 of motion picture film 10 adapted to be fed around a film sprocket 11, looped as at 12 and moved through the usual film gate (not shown) past the exposure opening and lens. The film is then again looped as at 13 and fed around a second sprocket 14 and then wound upon a takeup reel 15 mounted on the shaft or spindle 16. As is clear from Figure 3, there are provided the resilient guide fingers 17 arranged to normally hold the film 10 into engagement with the sprockets 11 and 14.

Mounted upon a suitable supporting plate 18 within the camera is a spring housing 19 within which is located a coil spring 20 serving as a motive power for driving the camera mechanism. This spring 20 is anchored at one end as at 21 to the spring housing 19 and secured at its opposite end in any suitable manner to the winding shaft 3. Any desired pawl and ratchet device may be provided in connection with the shaft 3 to permit placing the spring under tension by turning the shaft 3 in one direction.

Carried upon the shaft 3 is a large gear 22 meshing with a smaller gear 23 mounted upon a shaft 24, which shaft also carries a large gear 25 meshing with a gear 26 mounted upon a shaft 27. This shaft 27 carries a gear 28 meshing with pinions 29 and 30 carried upon the sprocket shafts 31 and 32 respectively.

Also mounted upon the shaft 27 is a crown gear 33 meshing with a pinion 34 secured upon the shutter shaft 35 whereby the shutter within the housing 7 is rotated.

Mounted also upon the shaft 27 is a gear 36 meshing with a pinion 37 slidably mounted upon the shaft 38 and rotatable therewith. This pinion 37 as will be noted from Figures 4 and 5 is relatively wide for a purpose to be described.

Figure 4:
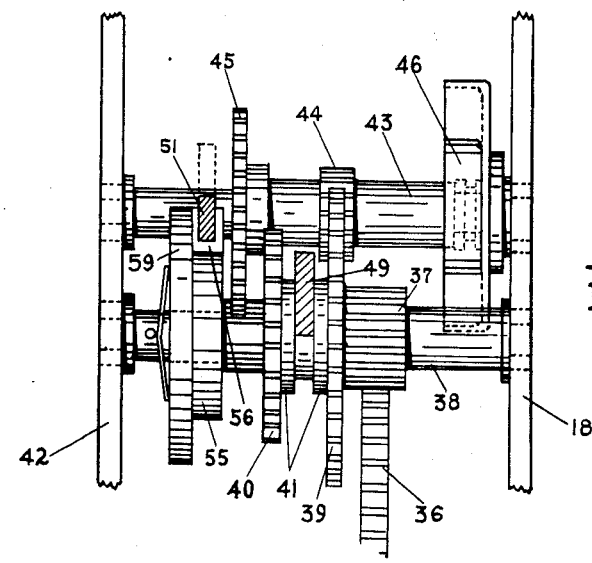
Figure 4 is a detail view of the speed change mechanism taken on the line 4—4 of Figure 2.
Figure 5:
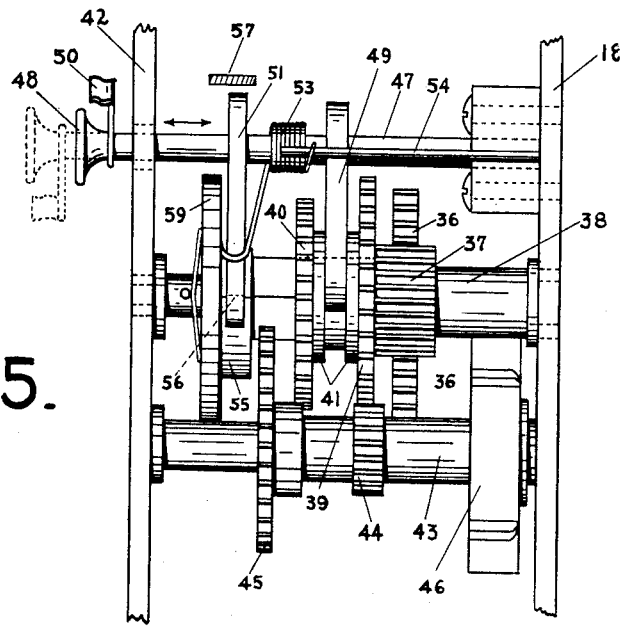
Figure 5 is a detail top plan view of the speed change mechanism shown in Figure 4.

Referring particularly now to Figures 4 and 5, it will be noted that also slidably mounted upon the shaft 38 is the relatively large gear 39 and also the relatively smaller gear 40, which together with the pinion 37 are slidable as a unit with the yoke 41 suitably mounted for sliding movement on the shaft 38 but rotatable therewith. This shaft 38 is suitably journaled between the supporting plates 18 and 42 within the camera and also journaled between these plates is a second shaft 43 upon which are fixedly mounted the pinions 44 and 45 spaced apart as shown in Figure 4. In one position of the slidable elements on the shaft 38, the gear 39 meshes with the pinion 44 to drive the shaft 43. In the other position of the sliding members on the shaft 38, the gear 39 is out of engagement with the gear 44 and the gear 40 is in mesh with the gear 45. The ratio of these gears is such that when they are in the position shown in Figure 4, that is with the gear 39 meshing with the gear 44, the shaft 27 and shutter shaft 35 will be permitted to rotate at the relatively slow or normal speed for taking the standard motion pictures. When, however, the slidable elements on the shaft 38 are shifted to bring the gear 40 into mesh with the gear 45, the higher speed of rotation results whereby more exposures per second are made and "slow motion pictures" provided.

A suitable centrifugal governor 46 of any desired construction is provided on the shaft 43 maintaining uniform rotation of the shafts at the different speeds for smoothness of operation.

Slidably journaled in the supporting plates 18 and 42 is a shaft 47 projecting at one end outwardly through the supporting plate 42 which also comprises the cover for one side of the camera, and terminating at its outer projecting end in a finger piece or button 48. Secured upon this slidable shaft 47 is an arm 49 extending into engagement with the yoke 41 whereby upon sliding the shaft 47 inwardly or outwardly will result in shifting the gears 39 and 40 and the pinion 37 on the shaft 38 whereby to change the speed as above described. It will be noted with reference to Figures 4 and 5 that the width of the pinion 37 permits such sliding movement without disengagement of the gear 36 therewith.

Figure 2:
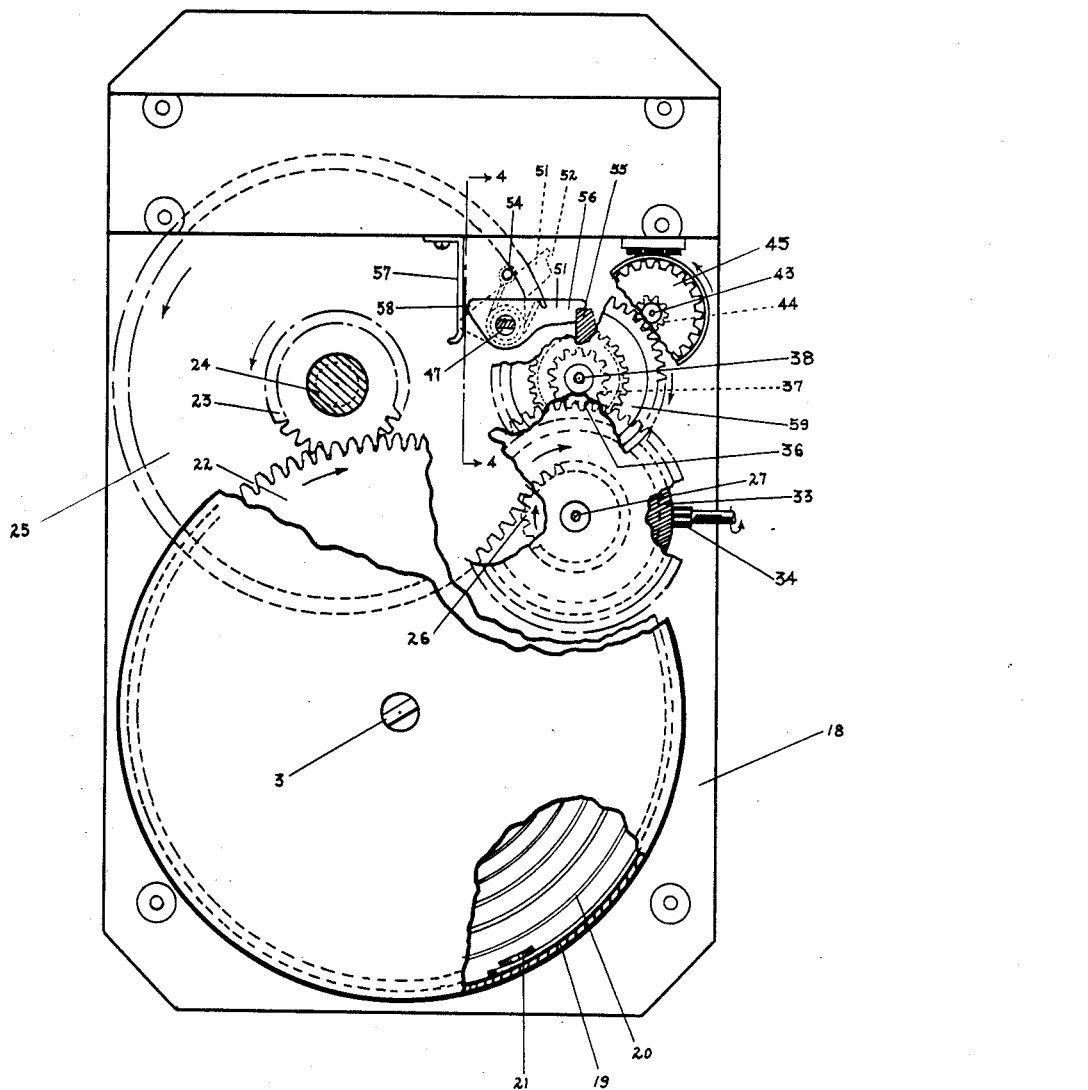
Figure 2 is a side view of a portion of the camera mechanism, certain parts being broken away for clearness.

The shaft 47 is also rotatable in its bearings and is provided at its outer projecting end adjacent the finger piece 48 with an operating lever 50 whereby the shaft may be rotated. Fixed upon this shaft 47 is a stop member 51 provided at its free end with a flat fixed shoulder 52 for a purpose to be described. A spring 53 is coiled about the shaft 47 and anchored at one end to a pin 54 suitably mounted in the supporting plate 18 and having its opposite end engaging the upper slide of the stop member 51, whereby said stop member is normally urged downwardly in Figure 2.

Fixedly mounted upon the shaft 38 is a stop disk 55 provided with a flat fixed stop shoulder 56 in the path of the stop member 51 whereby when said stop member is in its normally urged downward position, it will engage with this shoulder 56 on the stop disk 55 and thus prevent rotation of the shaft 38 and consequently operation of the winding mechanism. When the shaft 47 is rotated to the left in Figure 2, however, by means of the operating lever 50, the stop member 51 will be raised to the dotted line position in Figure 2 out of engagement with the stop disk 55 and the camera mechanism permitted to operate. There is provided a flat leaf spring 57 adjacent the rear end 58 of the stop member 51 and engageable thereby when the shaft 47 is turned a substantial distance, to hold said stop member in its raised position against the tension of the coil spring 53. Thus the mechanism may be released and permitted to run without the operator holding the shaft 47 in its turned position. It will be understood clearly, however, that unless the shaft 47 is turned a substantial distance, sufficient to permit the tailpiece or rear end 58 of the stop member 51 assuming an acute angle with respect to the spring 57, the coil spring 53 will return the stop member 51 to stopping position upon release of the operating lever 50 by the operator.

Mounted upon the shaft 38 and directly adjacent to the stop disk 55 is a second disk 59 of larger diameter than the stop disk 55 and with an uninterrupted periphery. It will be noted with reference to Figures 2, 4 and 5 that when the stop lever 51 is in its normal position and in engagement with the shoulder 56 on the stop disk 55, and with the camera mechanism therefore stopped, it is impossible to shift or slide the shaft 47 outwardly in order to change from low speed to high speed. This can only be accomplished after the shaft 47 has been turned to release the stop member 51 from the stop disk and the mechanism thus started to rotate at the normal or low speed. This is to prevent starting the mechanism off at once at high speed. It will be clear, therefore, that if the shaft 47 is turned and the mechanism released to rotate at normal speed, the shaft may then be shifted outwardly to the dotted line position shown in Figure 5 whereupon the stop member 51 will be positioned directly over the periphery of the disk 59 and of course in such position, the gear 40 will be in mesh with the gear 45 permitting the rotation of the parts at high speed.

With the parts in this position it will be clear also that the stop member 51 cannot be turned downwardly for engagement with the shouldered stop disk 55 until the shaft 47 has again been shifted inwardly and the speed changed from high to low speed by virtue of the gear shift executed by the sliding inwardly of the shaft 47. This prevents the quick stopping of the mechanism while running at high speed and its attendant dangers upon the rotating parts.

It should be observed here, however, that with the shaft 47 slid outwardly and the parts rotating at high speed, the stop lever 51 being over and in alignment with the periphery of the disk 59, may be turned downwardly so that the stop member drags or rides upon the periphery of such disk and thru pressure by the operator in turning the shaft 47 downwardly, the stop member 51 will act as a brake upon the disk 59, and by this means the mechanism may be brought to a slow stop even though running at high speed. This is desirable in some instances, for instance where the operator is waiting for a certain action which he wishes to photograph at high speed and desires to be instantly ready for it.

It will be clear from the foregoing that I have provided a simple and effective speed change mechanism for the film and shutter moving elements of a motion picture camera whereby the operator may easily and quickly shift from low or standard speed to high speed for the purpose of making "slow motion picture", and back again to standard speed. I have also provided safety means whereby except under certain desired conditions not harmful to the mechanism, it is possible only to start and stop the mechanism at low speed, the shift to high speed being necessarily made from and to low speed.

Of course, changes may be made in details of construction and arrangement of parts without departing from the spirit and scope of my invention. I do not limit myself, therefore, to the exact form herein shown and described other than by the appended claims.

I claim:—

1. A speed changing mechanism for motion picture cameras comprising a driving element and a driven element, shiftable speed change gears providing an operative connection therebetween, means for shifting said gears comprising a rotatable and slidable shaft having engagement with said gears, and a stop and release device on said shaft for said mechanism operable by rotation of said shaft.

2. A speed changing mechanism for motion picture cameras comprising a driving element and a driven element, shiftable speed change gears providing an operative connection therebetween, means for shifting said gears comprising a rotatable and slidable shaft having engagement with said gears, and a stop and release device on said shaft for said mechanism operable by rotation of said shaft, and means normally urging said shaft to stop position.

3. A speed changing mechanism for motion picture cameras comprising a driving element and a driven element, shiftable speed change gears providing an operative connection therebetween, means for shifting said gears comprising a rotatable and slidable shaft having engagement with said gears, and a stop and release device on said shaft for said mechanism operable by rotation of said shaft, and means normally urging said shaft to stop position, said shifting means being operable only when said shaft is turned to releasing position.

4. A speed changing mechanism for motion picture cameras comprising a driving element and a driven element, shiftable speed change gears providing an operative connection therebetween, means for shifting said gears comprising a rotatable and slidable shaft having engagement with said gears, and a stop and release device on said shaft for said mechanism operable by rotation of said shaft, and means normally urging said shaft to stop position, said shifting means being operable only when said shaft is turned to releasing position, and resilient means for holding said shaft in release position upon rotation of said shaft a predetermined amount.

5. A speed changing mechanism for motion picture cameras comprising a driving element and a driven element, shiftable speed change gears providing an operative connection therebetween, means for shifting said gears comprising a rotatable and slidable shaft having engagement with said gears, and a stop and release device on said shaft for said mechanism operable by rotation of said shaft, and means on said mechanism cooperating with said stop and release device whereby said stop and release device may be operated in either position of said shiftable speed change gears.

In testimony whereof, I affix my signature.

GUNNE LOWKRANTZ.